United States Patent [19]

Brodeur

[11] Patent Number: 4,979,154
[45] Date of Patent: Dec. 18, 1990

[54] LANDING AID FOR AIRCRAFT

[76] Inventor: Lester Brodeur, 135 Bush Hill Rd., Hudson, N.H. 03051

[21] Appl. No.: 296,509

[22] Filed: Jan. 10, 1989

[51] Int. Cl.$^5$ .............................................. G01S 15/00
[52] U.S. Cl. .................................................. 367/116
[58] Field of Search ....................... 367/116, 111, 110; 342/34; 381/51

[56] References Cited

U.S. PATENT DOCUMENTS

| | | | |
|---|---|---|---|
| 2,016,907 | 10/1935 | Rice | 177/352 |
| 2,098,287 | 11/1937 | Gent | 177/352 |
| 4,302,827 | 11/1981 | Rosenblum | 367/116 |
| 4,672,590 | 6/1987 | Tendler | 367/116 |

OTHER PUBLICATIONS

Hummingbird LCR 4000 Operations Manual, 1985, p. 2.

Primary Examiner—Thomas H. Tarcza
Assistant Examiner—Daniel T. Pihulic
Attorney, Agent, or Firm—Robert K. Tendler

[57] ABSTRACT

Ultrasonic echo ranging techniques and voice synthesis are used to provide a cost-effective convenient means of determining aircraft altitude during the landing phase of flight to overcome parallax problems, thereby to permit proper flare out, while maintaining constant visual contact down the runway during the landing procedure. In one embodiment a visual height indication or audible altitude annunciation is provided by through-the-air sonar ranging, with the display changing or an annunciation made only when the plane descends through predetermined altitudes such as 50, 25, 15, 10, 9, 8, 7, 6, 5, 4, 3, 2, 1, 0 feet. In the above embodiment the height is called out by converting a number representing height to a number which is audiblized in a human voice. This height annunciation technique may also be used with microwave range detection apparatus. In various embodiments, the altitude call outs may be periodic, for predetermined changes in altitude, or upon reaching predetermined heights above the runway. A specialized flare out annunciation may also be provided. As an added feature, an apertured focusing tube is used to maintain the transducer contamination to a minimum as is the use of a skeg in front of the open end of the focusing tube to divert air flow and thus contaminants.

12 Claims, 4 Drawing Sheets

LANDING AID FOR AIRCRAFT

FIELD OF THE INVENTION

This invention relates to landing assistance for aircraft, and more particularly to a sonar-based height-determination system, or to a system in which height above ground level is automatically called out to the pilot.

BACKGROUND OF THE INVENTION

To land an aircraft the pilot descends at a uniform slope, about 3 degrees, on approach to the landing area. When over the landing surface he executes a maneuver called "flare" or "flare out". During the "flare" he lifts the nose of the aircraft to arrest the previous sink rate and positions the aircraft in the landing attitude which is slightly nose high. The "flare" is executed ideally at a particular height above the landing surface, with the "flare" height being a function of the aircraft type, on the order of ½ to 1 wing span. If the "flare" is executed at too high a height above the landing surface, there exists a high probability of wing stall due to the fact that the nose high attitude is causing a rapid decrease in air speed. Such a stall would result in either a very hard landing, probably followed by bounce, or a catastrophic crash onto the landing surface. If the "flare" is executed at too low a height the aircraft will be in a nose low attitude which could result in a propeller strike in single engine aircraft, or a nose wheel first touch down which invites "wheel barreling" or "ground looping", both of which produce an uncontrollable direction of travel and generally result in substantial damage and/or injury.

A primary requirement during the landing phase of flight is therefore to have a knowledge of height above the landing surface while in the region of tens of feet in order to execute the "flare". A secondary requirement is to have a knowledge of height when in the region of a few feet to less than one foot so that up elevator can be applied to cause a smooth transition, near a zero rate of decent, from flight to rolling on the tires.

All aircraft determine in-flight altitude with a barometric altimeter referenced to Mean Sea Level (MSL). The barometric altimeter is never used by the pilot during the landing phase below about 200 feet above ground level (AGL). This is because current knowledge of the barometric pressure at the landing site cannot be trusted to the accuracy required in that 0.01 inches Hg corresponds to about 10 feet; and, the FAA required accuracy for such an altimeter is not sufficient for the decisions that have to be made during the final landing stage. Air Transport (ATP) category aircraft determine altitude during the landing phase by means of a radio altimeter. The radio altimeter echo ranges off the ground with a continuous wave or pulsed microwave carrier signal in a manner analogous to radar. The radio altimeter is in fact sometimes referred to as a radar altimeter. However, General Aviation aircraft are generally precluded from being equipped with a radio or radar altimeter for monetary reasons. This is unfortunate since the vast majority of the operational aircraft in the country, and the world, are General Aviation as opposed to air transport category aircraft. As a result of this, General Aviation pilots determine altitude or height above the landing surface by visual observation. And they do so day and night, even during instrument landing approaches; and over water for amphibious aircraft.

The problem with this is that a person cannot determine, even approximately, their height above a flat surface runway by looking down at it. For this reason student pilots are taught to look straight ahead and not down the runway. What the pilot is doing, without realizing it, is waiting for the runway edges to come up in his or her peripheral vision to an angle from the horizontal that corresponds to that used as a "flare" point in previously successful landings. This is why private pilots, in particular, are always doing "touch and go" practice landings.

Another problem that leads to "flare" point problems is variation in runway width, which is why pilots tend to "flare" high on wide and low on narrow runways. Since runway widths can vary from about 30 feet to over 200 feet this presents a significant problem to many pilots and explains why landings at unfamiliar airports are usually not as good as at their home base.

At night even a familiar airport induces a high "flare" point in that the runway edges appear to be further apart due to the indistinct contrast between pavement and ground. On the other hand, bright runway edge lights could produce the opposite illusion.

Sea plane pilots have an extreme problem in estimating their height above the water surface on which they intend to land. The visual clues used here are not well understood, except that it is well known that a choppy to slightly ruffled surface is much preferred to a smooth one. In fact on a glassy calm water surface the pilot has essentially no knowledge of his or her height above the surface. In this case the pilot is trained to position the aircraft in a landing attitude, nose up, and apply sufficient power so that the sink rate is very low. In this manner the surface comes up to greet the aircraft when it pleases to surprise the pilot. One, of course, needs a long landing site for this procedure. Fortunately this is quite often the case when landing on water, except of course for small lakes.

By way of further background, for those aircraft utilizing microwave landing systems it is often the case that the co-pilot of the aircraft reads the microwave indication of altitude and calls the altitude of the aircraft out to the pilot during such time as the pilot lands. While the accuracy of this system is dependent upon the microwave radar altimeter, it is oftentimes an annoyance to the co-pilot to have to call out the altitude during the landing phase, since his duties occupy him otherwise. Of course, as mentioned above, the majority of aircraft do not have microwave altimeters and thus even if an experienced co-pilot were there to call out the height of the aircraft above the ground, his estimates would undoubtedly be dependent on his skill and therefore subject to error.

Moreover, while in the past there have been so called "talking depth sounders" such as exemplified in the U.S. Pat. Nos. 4,487,405; 4,621,348; 4,616,350 and 4,672,590, these patents relate to aquatic depth determining measurements which utilize sonar transducers singularly unsuitable for through-the-air range finding. However, Polaroid Corporation of Cambridge, Mass. has developed sonar range finding equipment for use in cameras. Unfortunately, the transducers utilized in the Polaroid systems are excessively subject to contamination and are therefore not usable in an environment in which hydrocarbons exist or in which either erosion or other particulate contaminants operate to degrade the output of sonar transducer. Moreover, the range of such transducers are generally limited to 75 feet at a maximum for reasons of their construction and for their application in cameras in which focusing at distances greater than 75 feet is not desired. Additionally, while through-the-air transducers have been utilized to control industrial processes in which the position of articles on a conveyer belt is monitored through short distance sonar ranging systems, these systems are operative only to tens of feet. Moreover they can be located in a controlled environment such that contamination of the transducer surfaces or faces can be controlled. Of course, these transducers can be periodically cleaned or operated in a clean environment to assure production line operation. Thus prior through-the-air sonar ranging systems do not operate over sufficient ranges for aircraft use and are not designed to operate in a "dirty" environment.

SUMMARY OF THE INVENTION

In contradistinction to microwave altimeters, it has been found that a capacitive transducer operating at 50 kHz provides sufficient range so that ranging via sonar can take place in excess of 100 feet above tarmac and in excess of 50 above grass. It is a finding of this invention that when sonar emissions from the transducer are collumnated by a tube so as to give it a 8° to 12° beam width, effective ranging through all types of weather conditions including snow and rain can reliably be achieved. The result of utilizing an ultrasonic echo ranging system to determine aircraft height while over a landing sight permits a low cost accurate altimeter to be produced which can either be provided with a visual indication of altitude or preferably a human speech synthesized rendition of the altitude as the aircraft is descending. In the subject system, aircraft height above ground level over the landing site is ascertained sonically and measured in terms of a number corresponding to either the feet or meters above the ground level surface. This number is provided by either a digital indication of the height or a verbal annunciation, in a humanlike voice, of this number. In one embodiment the system is provided with a wheel offset such that zero feet corresponds to an offset of the distance between bottom of the wheels and the face of the transducer mounted in the fuselage of the aircraft. It has been found that the resolution and absolute accuracy of the system is on the order of one inch.

It will be appreciated that whether the altimeter is a microwave altimeter or an ultrasonic altimeter, a verbal annunciation of altitude allows for the freeing up of the pilot to engage in the other activities during the landing sequence. A constant update of the height above the runway assures the pilot of his position above the runway. This being the case the pilot can ascertain when to "flare" his aircraft. Moreover a special verbal annunciation of the point at which a flare should take place may be programmed into the microprocessor driving the speech synthesizer, and may be set for the particular aircraft involved. This is unlike the verbal annunciation provided to a pilot by the system described in U.S. Pat. No. 3,907,223 which indicates only the position down the length of the runway, which is a less useful indication than the height of the aircraft above the runway.

In summary, ultrasonic echo ranging techniques and voice synthesis are used to provide a cost-effective convenient means of determining aircraft altitude during the landing phase of flight to overcome parallax problems, thereby to permit proper flare out, while maintaining constant visual contact down the runway during the landing procedure. In one embodiment a visual height indication or audible altitude annunciation is provided by through-the-air sonar ranging, with the display changing or an annunciation made only when the plane descends through predetermined altitudes such as 50, 25, 15, 10, 9, 8, 7, 6, 5, 4, 3, 2, 1, 0 feet. In the above embodiment the height is called out by converting a number representing height to a number which is audiblized in a human voice. This height annunciation technique may also be used with microwave range detection apparatus. In various embodiments, the altitude call outs may be periodic, for predetermined changes in altitude, or upon reaching predetermined heights above the runway. A specialized flare out annunciation may also be provided. Moreover, an apertured focusing tube may be used to maintain the transducer contamination to a minimum, as is the use of a skeg in front of the open end of the focusing tube to divert air flow to also divert contaminants from the face of the transducer.

BRIEF DESCRIPTION OF THE DRAWINGS

These and other features of the Subject Invention will be further understood in conjunction with the Detailed Description taken in conjunction with the Drawings of which.

DETAILED DESCRIPTION

Figure 1A:
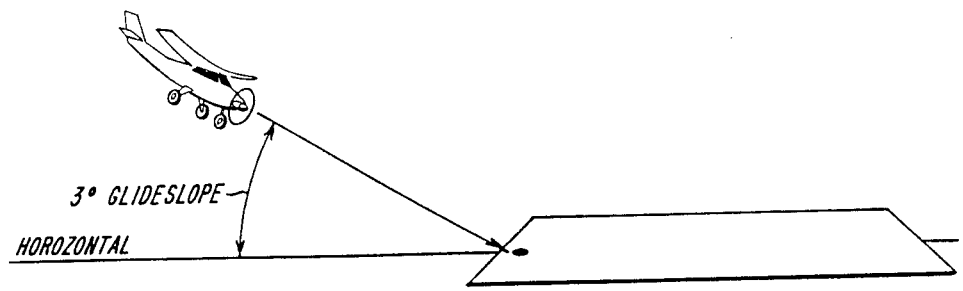
FIGS. 1A–1D depict the problem of optically determining the flare point.

Referring to FIG. 1A and as described in a book entitled The Proficient Pilot, by Barry Chiff, as one begins the long straight in approach, airport lights are set to minimum intensity and predictably the pilot is considerably above the glide slope before initiating descent. What this means is that the pilot senses being farther out than he really is. Typically what happens in this case is that the controller is signalled to gradually increase the lights to maximum brilliance. As the lights come up it is oftentimes usual to gradually increase the sink rate and power reduction. However upon so doing the aircraft is literally diving towards the airport. Thus although in the above night time situation the glide slope at the beginning of the descent is beneath the aircraft, the aircraft after such a maneuver is uncomfortably below the glide slope. Such an experiment verifies the illusory effects which can be expected when airport lights are unusually dim or bright. This points out the difficulty in the illusions that occur at night or even in daylight operation.

Referring to FIG. 1A an aircraft is shown in a normal, 3°, visual descent towards a level runway. The pilot can maintain this "3° slot" quite accurately because primarily of the touch and go experience during his flying career. What this means is that the pilot approaches a runway so that the visual glide slope "seems" neither too shallow nor too deep.

Figure 1B:
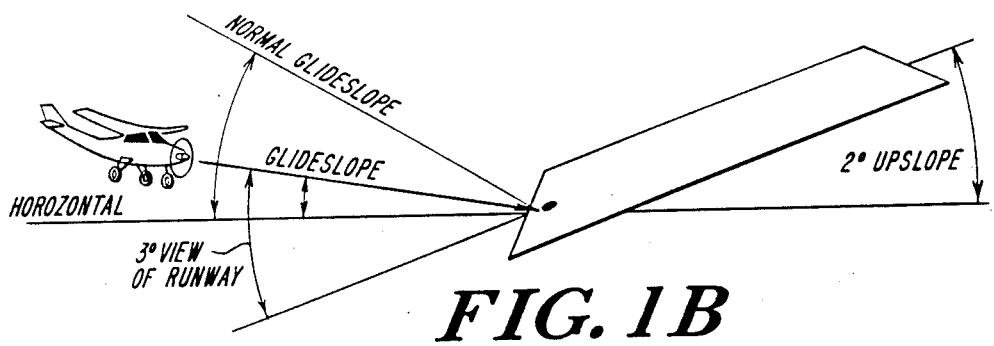

A visual illusion develops when approaching a runway with a pronounced upslope as shown in FIG. 1B. If the pilot establishes a 3° approach slot relative to the horizontal, while approaching a runway with a 2° up slope, the pilot would sense that he is descending too steeply. This is because he would be aware of descending at a 50° angle with respect to the runway. As a result, the pilot automatically compensates by "dropping down" until the runway "looks right". In other words the pilot settles into a 3° glide path with respect to the runway. As he always does, unfortunately, this results in a dangerously low, flat approach as illustrated.

Figure 1C:
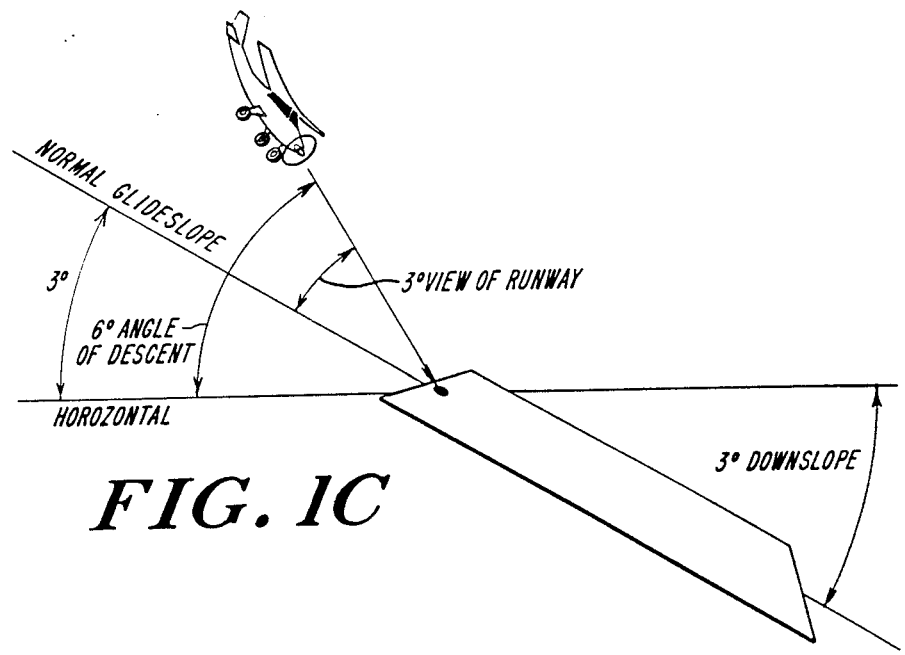

On the other hand, a down slope runway as depicted in FIG. 1C leads to overshoots. The runway shown has an admittedly steep 3° down slope, but illustrates the illusion associated with shallower slopes. When in a 3° approach slot relative to the horizontal, pilots can only see the approach edge of the runway, leading them to believe they are extremely low. As a result they level off until the runway can be viewed at a normal 3° angle. This, of course, produces a steep, 6° descent path with respect to the ground and it substantially increases the likelihood of an overshoot.

It will be appreciated that terrain surrounding an airport often has a slope comparable to that of the runway, which makes it difficult to determine in advance whether a given runway is sloped or levelled. Often, the only clue afforded the observant pilot is the normal sink rate required to maintain what appears to be a normal slot. When approaching a bowl-shaped runway with a pronounced dip in the middle the proper procedure would be to use only the first half or the down slope portion of the runway to establish a visual glide path. By maintaining what then appears to be a somewhat flat approach, one can be close to the proper slot.

Conversely if the runway is convex, one is referred only to the first up hill portion of the runway which establishes what appears to be only a slightly steep approach path.

What will be appreciated is runway geometry can be deceiving. Without realizing it, a pilot usually assesses the runway before and by comparing it with the runway to which he is most accustomed. Assuming that a pilot is conditioned to landing on a 4,500 by 150 foot runway which has a length to width ratio of 30 to 1, from above afar, a longer runway with the same proportions, eg., 6,000 feet by 200 feet, has an identical appearance. But because the runway is larger, the pilot is lead to believe that he is closer and lower than he really is. The more hazardous illusion occurs when approaching a shorter runway with the above proportions. When on a final approach to the smaller runway, the pilot perceives being farther from the runway and higher above the runway than he actually is.

Figure 1D:
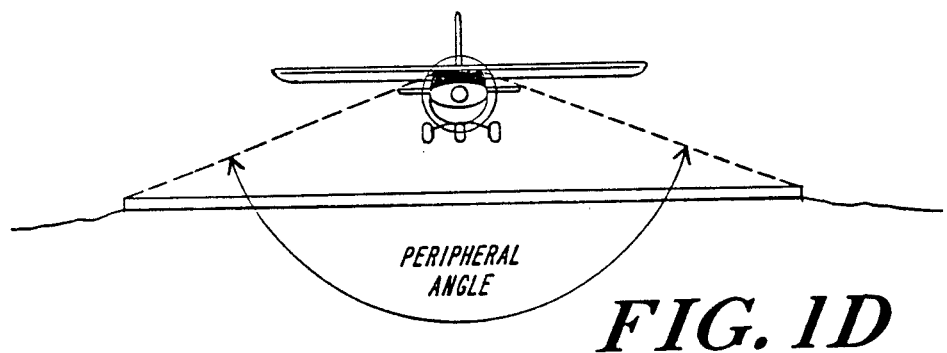

Runway width, irrespective of length, can adversely affect judgement during flare out. Whether or not the pilot realizes that, a pilot uses peripheral vision to determine when he is at the proper height above the runway to initiate the landing flare. He does this during the last several feet of descent by subconsciously waiting for the edges of the runway to spread laterally beneath the aircraft until reaching the angle to which he is conditioned. This is shown by FIG. 1D.

When one is descending towards an unusually wide runway, this peripheral angle forms while the plane is considerably higher than usual above the ground. By yielding to the subconscious suggestion that the pilot initiate the flare at this time the pilot may run out of air speed while several feet in the air. Conversely, when one is descending toward a narrow runway, the lateral spread of the runway edges may not be sufficient for the peripheral clue to form and can result in the failure of a pilot to flare in time to avoid a hard landing.

The problems posed by wide and narrow runways are particularly acute at night when it is more difficult to judge height above ground. This is because of the lack of contrast between the runway and surrounding terrain. A similar loss of depth perception occurs during daylight hours when there is little or no contrast between the adjacent terrain, such as when the entire airport is snow or water covered. This also occurs when one is landing on open areas of dirt or grass and when one is approaching hard surfaced runways surrounded by similarly colored sand. Visibility restrictions aggravate the problem by further reducing colored contrast.

What will be appreciated from the above is that without the provision of a sufficiently accurate altimeter and call out at low altitudes, the landing of aircraft is highly dependent upon the skill of the pilot.

While the aforementioned problems are severe, they can be economically and reliably solved through the utilization of a ultrasonic altimeter which either gives a visual indication of low level altitude, or gives a verbal annunciation of a number corresponding to the altitude of the aircraft. The altitude which is annunciated or indicated may be offset in accordance with the distance between the transducer and the bottom of the wheels of the aircraft. In general however this annunciation will enable the pilot, rather than relying on his visual perception of the runway, to establish accurately not only his height above the runway but also may be utilized to give either visual or audible cues as to the point at which flare out is to be commenced.

It is a finding of the Subject Invention that when utilizing a capacitive transducer which is unaffected by contamination, there exists a window at 50 kHz which permits accurate altitude determination above a tarmac runway on the order of 100 feet and over grass of approximately 50 feet. As discussed above, it is the last few feet which are critical to the pilot in the landing procedure. Thus, while microwave altimeters provide reliable altitude determinations in excess of 100 feet, the ultrasonic system described herein is both accurate and inexpensive at the point in the landing procedure which is critical. The system to be described below therefore provides an aid to the landing procedure both as a verbal height annunciator and as inexpensive sonar apparatus which uniquely provides for reliable altitude measurements and, which, can read through most physical conditions surrounding the aircraft such as dust, fog, and rain. It is a specific finding of the Subject Invention that focused 50 kHz sonic energy can provide a reasonable margin of safety in the critical landing zone.

Figure 2:
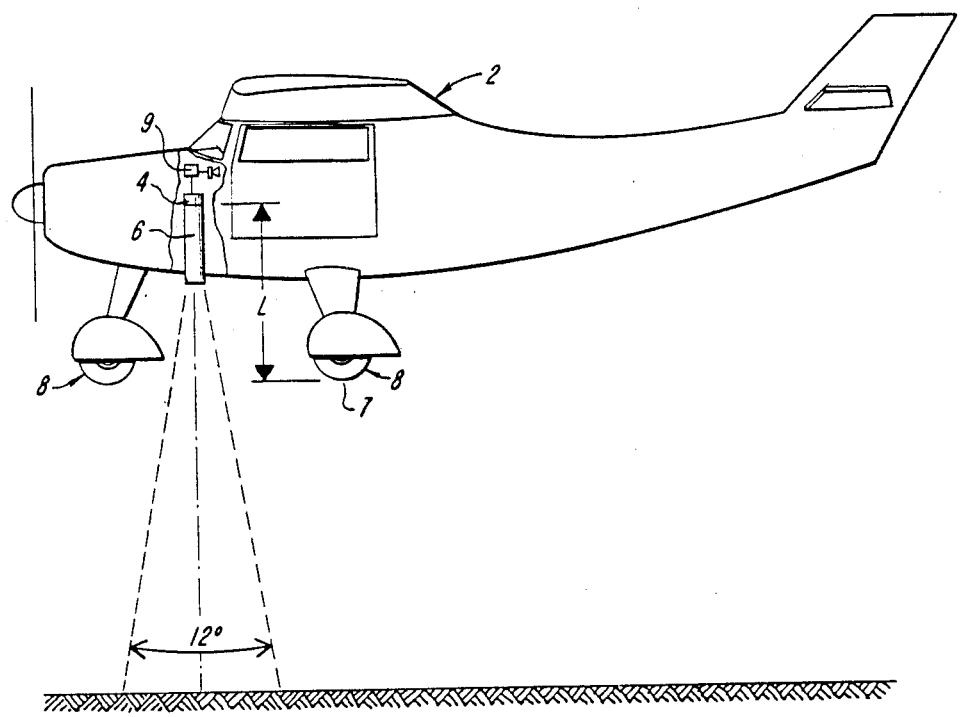
FIG. 2 is a side view of an aircraft illustrating transducer placement and offset distance.

Referring now to FIG. 2 an aircraft 2 is depicted in which a capacitor transducer 4 is mounted to the belly of the aircraft with a focusing tube 6 pointed downwardly. Note an offset distance, L, between the face of transducer 4 and the bottom 7 of wheels 8. This offset will be discussed later.

Figure 3:
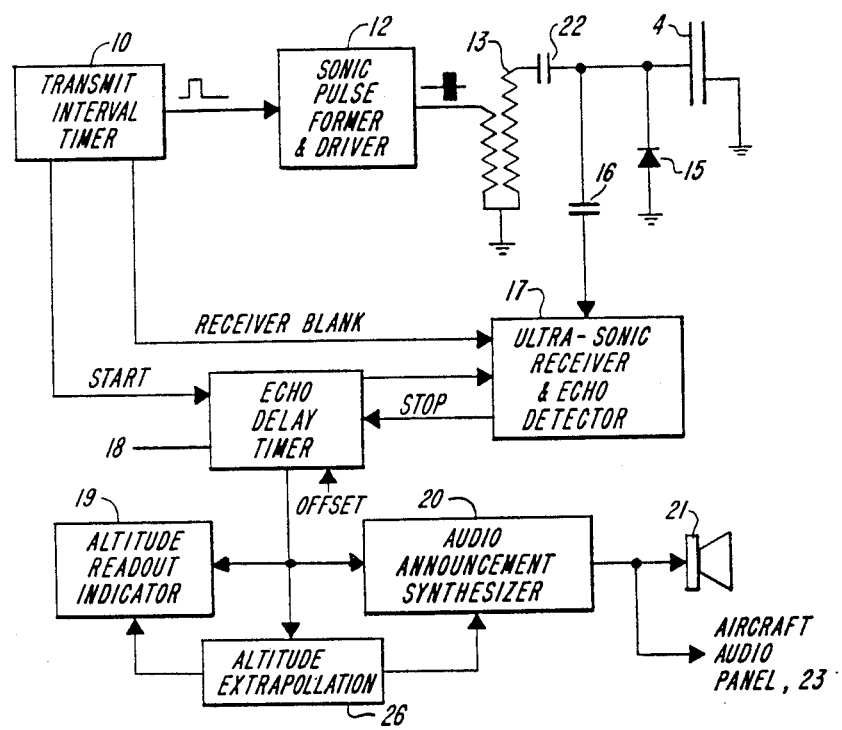
FIG. 3 is a block diagram of the ultrasonic ranging system used to determine and indicate or announce aircraft height.

Referring now to FIG. 3, on board the aircraft is a sonic altimeter 9 having a repetition rate timer 10 used to initiate an ultrasonic pulse transmission at a rate of a few transmissions per second. A sonic pulse former and driver 12 pulse modulates an ultrasonic carrier, generally about 50 kHz, and provides the power drive to the output coupling transformer 13. Either one or a group of pulses may be so formed for each transmission event. The output transformer 13 steps the pulsed carrier voltage up to a few hundred volts for the purpose of driving capacitive transducer 4, which may be model MC102-002 manufactured by Ocean Motions Company of Barrington, R.I. It is a property of this transducer that it is virtually unaffected by hydrocarbon contamination or airborne particles. Erosion is limited by focusing tube 6 usually provided with this transducer which, inter alia, limits the beamwidth to 12°. A dc restoring diode 15 and a dc blocking capacitor 22 causes the transducer to be charged to the average pulse voltage so that it is properly biased for subsequent receive mode operation. At some time, the sonic round trip propagation time from the aircraft to the ground, after the transmit pulse or pulses an echo of the transmit pulse is picked up by the transducer 4 and is ac coupled via capacitor 16 to the receiver 17 tuned to the transmit carrier frequency a blanking time gate is also applied to the receiver 17 by transmit interval timer 10. This gate mutes the receiver during the time of the transmit pulse and for a short time thereafter to prevent extreme receiver overload. A microprocessor based echo timer 18 is started in time coincidence with the beginning of a transmit pulse and is stopped by the arrival of the first echo. This circuit, amongst other things, also generates a voltage ramp, with time, that is used to progressively increase the receiver gain in that amplitudes will be inversely proportional to the forth power of time due to propagation spreading of the sonic energy that was transmitted and reflected from the terrain surface.

The echo delay time as measured by microprocessor-driven unit 18, which is directly proportional to round trip propagation time and therefore aircraft height, is adjusted for the wheels to transducer distance offset, L, by circuit 18 and is used to drive the altitude readout indicator 19 with a number reflecting calculated altitude. This readout indicator can be an analog meter, digital display, bar graph or other graphic type display. Special altitude indicators or annunciators can also be included such as a light or buzzer for the "flare" and or a "touch down eminent" annunciation. Height reporting can also be accomplished by a voice synthesizer 20 provided with a number corresponding to altitude. The output of the synthesizer drives a speaker 21 or is mixed with the aircraft audio at panel 23. Synthesizer 20 is preferably programmed to report specific altitudes, calling them out in feet, or meters, as well as operational altitude points as "flare", "touch down", etc. Alternatively, height can be periodically called out, or annunciation can be predicated on predetermined changes in height.

As will be appreciated, the microprocessor in unit 18 is computing altitude several times per second. Since the microprocessor contains an internal software timer it can also compute rate of change of altitude. Current altitude plus rate of change times T, time, yields a calculated, or predicted altitude at some future time, $T_f$, assuming a uniform rate of change of altitude. Since human reaction time is finite and on the order of ¼ of a second; and, since it takes another ¼ second to initiate an operative reaction, it may be desirable to indicate or annunciate the altitude at some future or extrapolated time to anticipate the pilot's reaction time. For instance, the rate of altitude decrease for a 3 degree approach slope at 100 knots, forward velocity, is 525 feet per minute. Therefore, in this example, a pilot who desires to make a control change 4.4 feet later. This does not seem like a large discrepancy; but if the pilot, for instance, has decided on a 12 foot flare point, this lag introduces a 36% error. Such a predictive function and output is supplied by altitude extrapolation unit 26.

Figure 4:
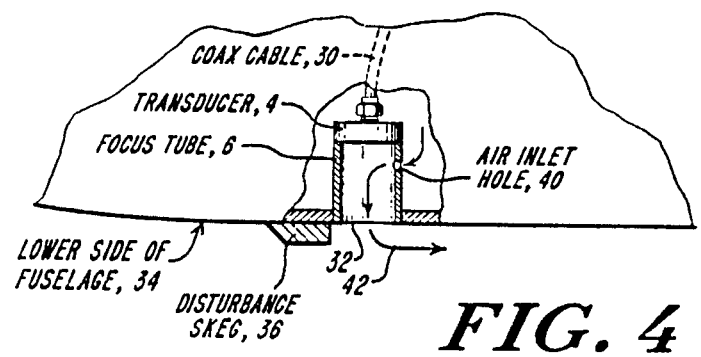
FIG. 4 is a schematic and side view of the transducer mounting showing the use of a skeg and apertured focusing tube for deflection of contamination; and, FIG. 5 is a bottom view of the installation of FIG. 4.
Figure 5:
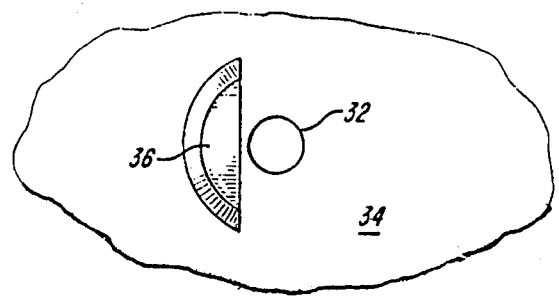

Referring now to FIGS. 4 and 5 these figures show a detailed mounting view. The sonic transducer 4 is located at the upper end of an open-ended focus tube 6, with a coaxial cable 3° feed to the transmitter/receiver. The outboard end of this tube 32 cannot be covered in an attempt to keep the transducer surface free of contamination since any such covering will severely reduce the sonic transmission and reception efficiency. The most appropriate location will generally be on the lower side 34 of the aircraft fuselage, as opposed to the wing surface. Unfortunately the belly side of the fuselage on a single engine aircraft is covered with an oil/hydrocarbon/dirt film at all locations down stream from the engine exhaust. This exhaust by-product film will have a detrimental effect on the sonic efficiency of the transducer if it is allowed to collect on the transducer face. Therefore, it is a further aspect of the invention that a disturbance skeg 36 is located on the external aircraft skin, just forward of the open end of the transducer focus tube 6. Further, a small air inlet hole 40 is located on the focus tube wall just below the face of the transducer and internal to the aircraft such that internal aircraft air is allowed access into the focus tube at this point. While in flight, as a result of Bernoulli's Principle, a low pressure area will form at the opening of the focus tube drawing internal cabin air down through the tube as shown by arrow 42 which keeps any aft moving exhaust products from moving up and onto the transducer face.

What will be appreciated is that the apertured focusing tube results in outward air flow. With the addition of the skeg, the Bernoulli flow is increased. The skeg also is used to deflect contamination flow away from the transducer, and may be used without an apertured focusing tube to do so.

It will be appreciated what is provided by the Subject System is first and foremost a sonic altimeter capable of being manufactured extremely inexpensively which is not susceptible to hydrocarbons or degradation due to environmental factors surrounding the aircraft. Secondly, regardless of whether a sonic altimeter is utilized, a method and apparatus is provided for altering or cueing the pilot to his altitude by verbally announcing the altitude to the pilot. This permits the pilot not only to be aware of his altitude upon final approach and landing, it also permits the pilot to busy himself with other activities necessitated by the landing procedure. Of course, the sonic altimeter may be combined with the speech synthesizing feature to provide an extremely low cost, accurate and beneficial system for the everyday pilot.

Having above indicated a preferred embodiment of the present invention, it will occur to those skilled in the art that modifications and alternatives can be practiced within the spirit of the invention. It is accordingly intended to define the scope of the invention only as indicated in the following claims:

I claim:

1. Apparatus for assisting in the landing of an aircraft by measuring the eight of an aircraft above its intended landing surface and annunciating height, comprising:
    means for transmitting ultrasonic pulses directed downward from the aircraft so as to be reflected by the surface over which the aircraft is moving;

timing means for measuring the altitude of said aircraft in terms of the round trip echo delay from said surface; and, means for verbally announcing the measured altitude of said aircraft above said surface in human speech at predetermined times corresponding to the passage of said aircraft through predetermined altitudes.

2. The apparatus of claim 1 where the known round trip sonic propagation time from the transducer to the landing gear bottom surface is substracted from the total measured altitude in a manner that allows indicated altitude to be that from the landing gear bottom surface to said landing surface.

3. The apparatus of claim 1 wherein operational words are voice synthesis annunciated at one or more specific predetermined altitudes above said surface.

4. The apparatus of claim 3, wherein operational words are voice synthesis annunciated at one or more specific altitudes in addition to the predetermined altitudes.

5. The apparatus of claim 1 wherein said transmitting means includes a transducer and a focusing tube having an aperture therein, said aircraft having an apertured bottom surface, with the open end of said tube at said bottom apertured bottom surface, whereby during flight, airflow from the interior of the aircraft moves outwardly through said tube.

6. The apparatus of claim 5 and further including a skeg in front of said open end of said tube.

7. The apparatus of claim 1 wherein said announcing means includes means for displaying current altitude above said surface in graphic form.

8. The apparatus of 1 and further including means for graphically displaying current altitude and predicted future altitude, where the future predicted altitude is based on extrapolating a previous altitude trend.

9. The apparatus of claim 1 wherein said transmitting means includes a transducer with a focusing tube having an open end through the bottom of said aircraft and a skeg mounted to the bottom of said aircraft ahead of said open end of said tube.

10. Apparatus for measuring the height of an aircraft above its intended landing surface, comprising:
means for transmitting ultrasonic pulses directed downward from the aircraft so as to be reflected by the surface over which the aircraft is moving;
means for measuring the altitude of said aircraft in terms of the round trip echo delay from said surface; and
means for indicating the measured altitude of said aircraft above said surface, said apparatus further including means for graphically displaying current altitude and predicted future altitude, where the future predicted altitude is based on extrapolating a previous altitude trend.

11. Apparatus for measuring the height of an aircraft above its intended landing surface, comprising:
means for transmitting ultrasonic pulses directed downward from the aircraft so as to be reflected by the surface over which the aircraft is moving;
timing means for measuring the altitude of said aircraft in terms of the round trip echo delay from said surface; and
means for indicating the measured altitude of said aircraft above said surface, said transmitting means including a transducer with a focusing tube having an open end through the bottom of said aircraft and a skeg mounted to the bottom of said aircraft ahead o said open end of said tube.

12. Apparatus for aiding in the landing of an aircraft comprising:
means for ascertaining the altitude of said aircraft above ground as a digital number representing altitude; and,
means coupled to said ascertaining means and including a voice synthesizer for automatically converting the digital number representing altitude to human speech for annunciating to the pilot of said aircraft the ascertained altitude.

* * * * *